(12) United States Patent
M. et al.

(10) Patent No.: US 11,811,891 B2
(45) Date of Patent: *Nov. 7, 2023

(54) REAL-TIME DETECTION OF COMPLETION OF SENSOR WRAP COMPLETION IN GNMI TELEMETRY OF A NETWORK DEVICE

(71) Applicant: Juniper Networks, Inc., Sunnyvale, CA (US)

(72) Inventors: Vivek M., Bangalore (IN); Rahul Puthukkariyil Raghavan, Bangalore (IN); Amish Anand, Santa Clara, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/147,892

(22) Filed: Dec. 29, 2022

(65) Prior Publication Data

US 2023/0134135 A1 May 4, 2023

Related U.S. Application Data

(63) Continuation of application No. 17/172,720, filed on Feb. 10, 2021, now Pat. No. 11,570,266.

(51) Int. Cl.
*H04L 67/55* (2022.01)
*H04L 67/12* (2022.01)

(52) U.S. Cl.
CPC .............. *H04L 67/55* (2022.05); *H04L 67/12* (2013.01)

(58) Field of Classification Search
CPC .............................. H04L 67/12; H04L 67/55
USPC .......................................................... 709/223
See application file for complete search history.

(56) References Cited

U.S. PATENT DOCUMENTS

| | | | |
|---|---|---|---|
| 8,874,720 | B2 | 10/2014 | Gilmour et al. |
| 9,854,551 | B2 | 12/2017 | Davis et al. |
| 11,134,446 | B2 | 9/2021 | Cole et al. |
| 2014/0236894 | A1 | 8/2014 | Hoffman et al. |
| 2014/0335839 | A1 | 11/2014 | Rubin et al. |
| 2017/0078195 | A1 | 3/2017 | Raman et al. |

(Continued)

FOREIGN PATENT DOCUMENTS

| CN | 107431644 A | 12/2017 |
|---|---|---|
| CN | 111971982 A | 11/2020 |

OTHER PUBLICATIONS

Extended European Search Report for Application No. EP22155676.4, dated Jul. 29, 2022, 5 pages.

(Continued)

*Primary Examiner* — James E Springer
(74) *Attorney, Agent, or Firm* — Harrity & Harrity, LLP

(57) ABSTRACT

A device may provide, to a network device, a subscribe request that includes a request for sensor data, and may receive sensor data packets that include the sensor data and header extensions identifying a group identifier for a group of sensor data and final packet information indicating whether the sensor data packet is a final one for the group. The device may store the sensor data packets until the final packet information of one of the sensor data packets indicates that the one of the sensor data packets is a final sensor data packet for the group, and may identify a complete set of the sensor data packets when the final packet information of the one of the sensor data packets indicates that the one of the sensor data packets is the final sensor data packet. The device may perform actions based on the complete set.

20 Claims, 9 Drawing Sheets

(56) References Cited

U.S. PATENT DOCUMENTS

2017/0293273 A1  10/2017  Slupik et al.
2022/0256003 A1   8/2022  M et al.

OTHER PUBLICATIONS

Korshunov., "Advanced Topics in XR Telemetry," Jan. 1, 2019, pp. 8-65, XP002806972, Retrieved from the Internet[URL:URL:https://www.ciscolive.com/c/dam/r/ciscolive/emea/docs/2019/pdf/BRKSPG-2503.pdf] [retrieved on Jun. 30, 2022].

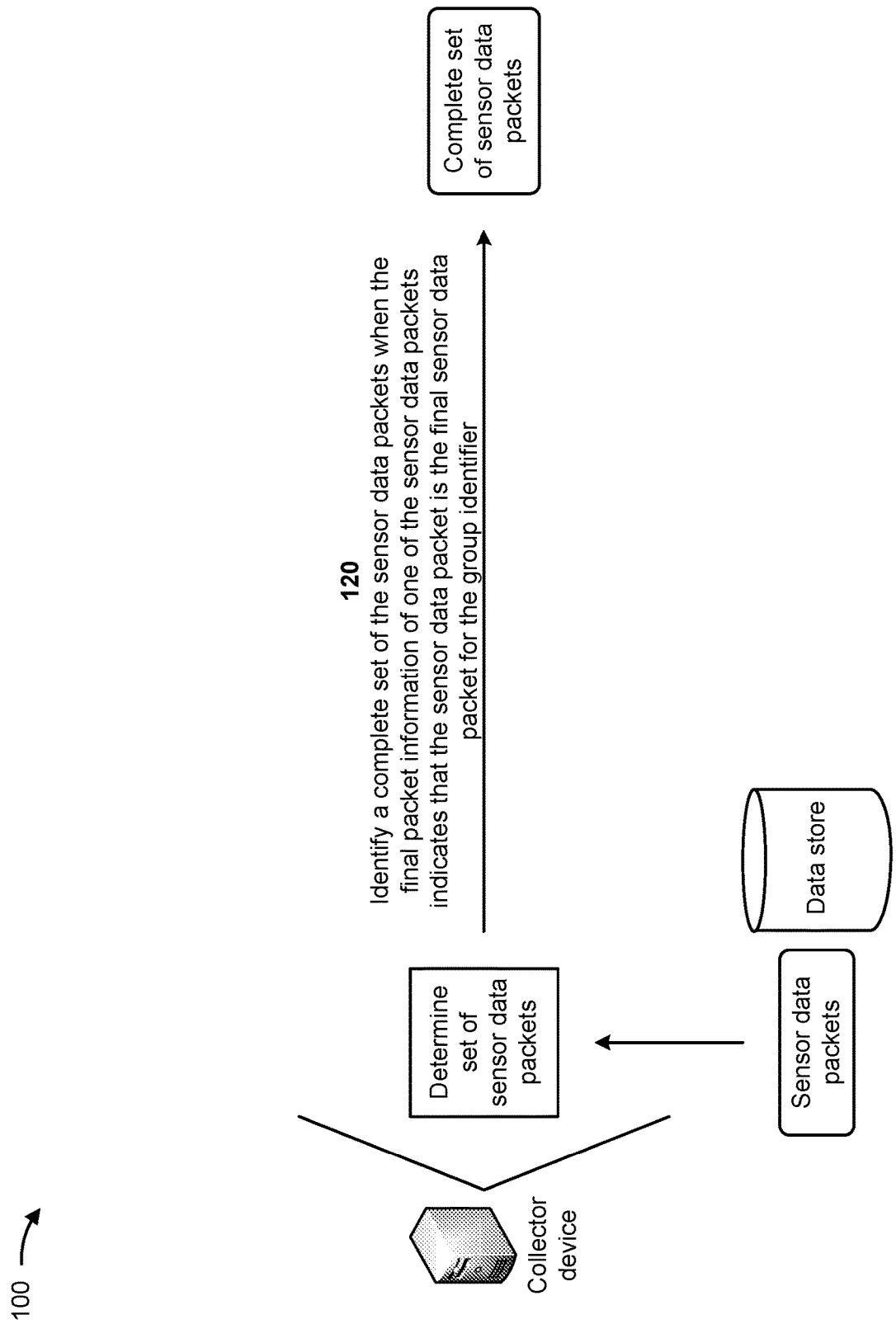

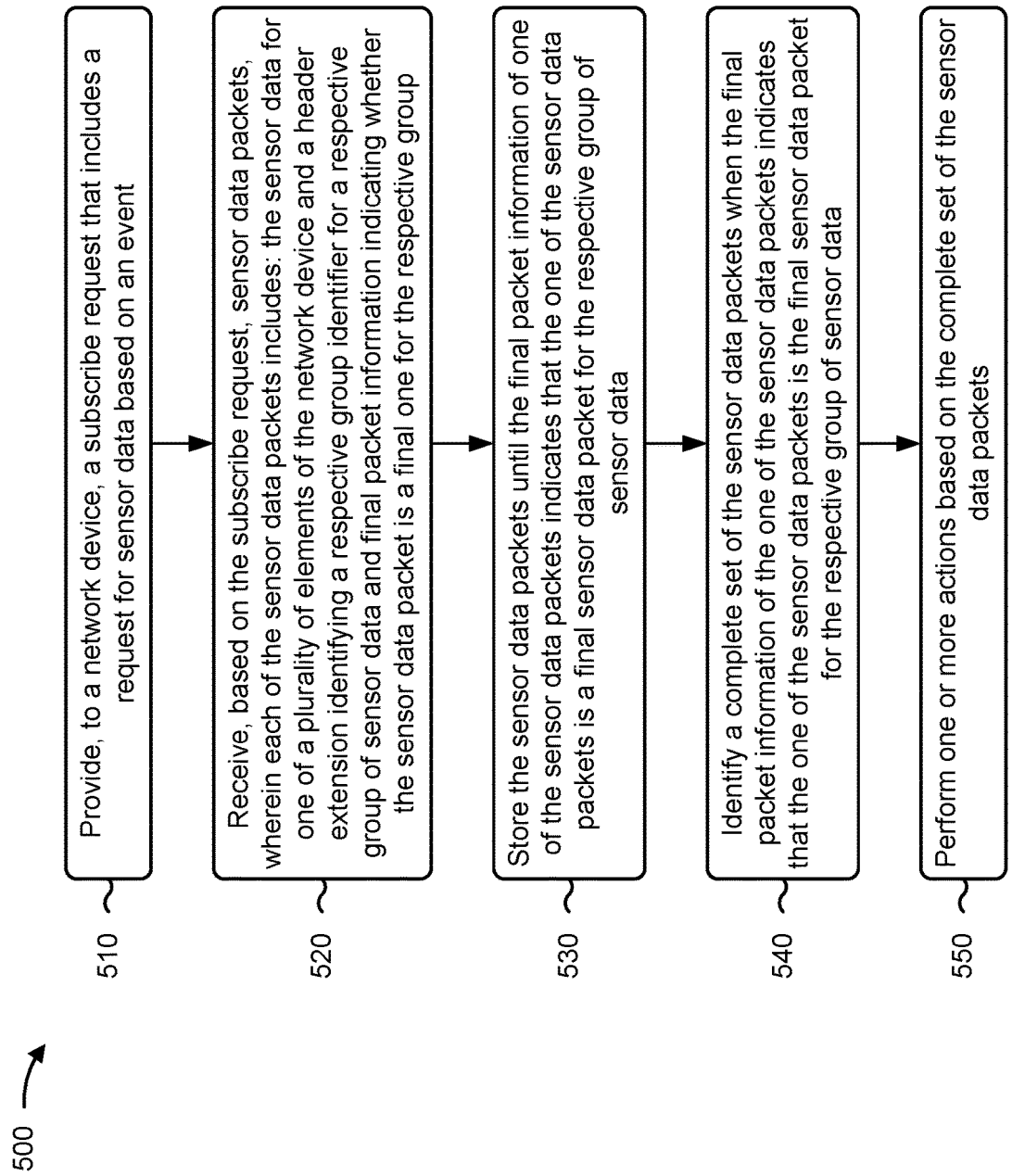

REAL-TIME DETECTION OF COMPLETION OF SENSOR WRAP COMPLETION IN GNMI TELEMETRY OF A NETWORK DEVICE

RELATED APPLICATION

This application is a continuation of U.S. patent application Ser. No. 17/172,720, filed Feb. 10, 2021, which is incorporated herein by reference in its entirety.

BACKGROUND

Telemetry operations require intense data processing in real-time to build a scalable, reliable, and maintainable network management solution. Google remote procedure call network management interface (GNMI) protocol is a widely adopted protocol for such a network management solution.

SUMMARY

In some implementations, a method may include providing, to a network device, a subscribe request that includes a request for sensor data based on an event, and receiving, based on the subscribe request, sensor data packets, wherein each of the sensor data packets includes the sensor data for one or more elements of the network device, a header extension that includes a respective group identifier for a respective group of sensor data, and final packet information indicating whether the sensor data packet is a final one for the respective group. The method may include storing the sensor data packets until the final packet information of one of the sensor data packets indicates that the one of the sensor data packets is a final sensor data packet for the respective group of sensor data, and identifying a complete set of the sensor data packets when the final packet information of the one of the sensor data packets indicates that the one of the sensor data packets is the final sensor data packet for the respective group of sensor data. The method may include performing one or more actions based on the complete set of the sensor data packets.

In some implementations, a device may include one or more memories, and one or more processors to provide, to a network device, a subscribe request that includes a request for sensor data based on an event, and receive, based on the subscribe request, sensor data packets, wherein each of the sensor data packets includes the sensor data for one of a plurality of interfaces of the network device, a header extension identifying a respective group identifier and final packet information indicating whether the sensor data packet is a final one for a group of sensor data associated with the respective group identifier. The one or more processors may store the sensor data packets until the final packet information of one of the sensor data packets indicates that the one of the sensor data packets is a final sensor data packet for the respective group identifier, and may identify a complete set of the sensor data packets when the final packet information of the one of the sensor data packets indicates that the one of the sensor data packets is the final sensor data packet for the group of sensor data. The one or more processors may analyze the complete set of the sensor data packets to generate at least one result, and may perform one or more actions based on the at least one result.

In some implementations, a non-transitory computer-readable medium may store a set of instructions that includes one or more instructions that, when executed by one or more processors of a device, cause the device to provide, to a network device, a subscribe request that includes a request for sensor data based on an event, wherein the subscribe request causes the network device to install software-defined sensors that collect the sensor data associated with a plurality of elements of the network device. The one or more instructions may cause the device to receive, based on the subscribe request, sensor data packets, wherein each of the sensor data packets includes the sensor data for one of the plurality of elements of the network device, a header extension identifying a respective group identifier and final packet information indicating whether the sensor data packet is a final one for a group of sensor data associated with the respective group identifier. The one or more instructions may cause the device to store the sensor data packets until the final packet information of one of the sensor data packets indicates that the one of the sensor data packets is a final sensor data packet for the group of sensor data. The one or more instructions may cause the device to identify a complete set of the sensor data packets when the final packet information of the one of the sensor data packets indicates that the one of the sensor data packets is the final sensor data packet for the group of sensor data, and perform one or more actions based on the complete set of the sensor data packets.

BRIEF DESCRIPTION OF THE DRAWINGS

FIGS. 1A-1E are diagrams of an example implementation described herein.

FIG. 5 is a flowchart of an example process for real-time detection of completion of collected sensor data of a network device.

DETAILED DESCRIPTION

Figure 1A:
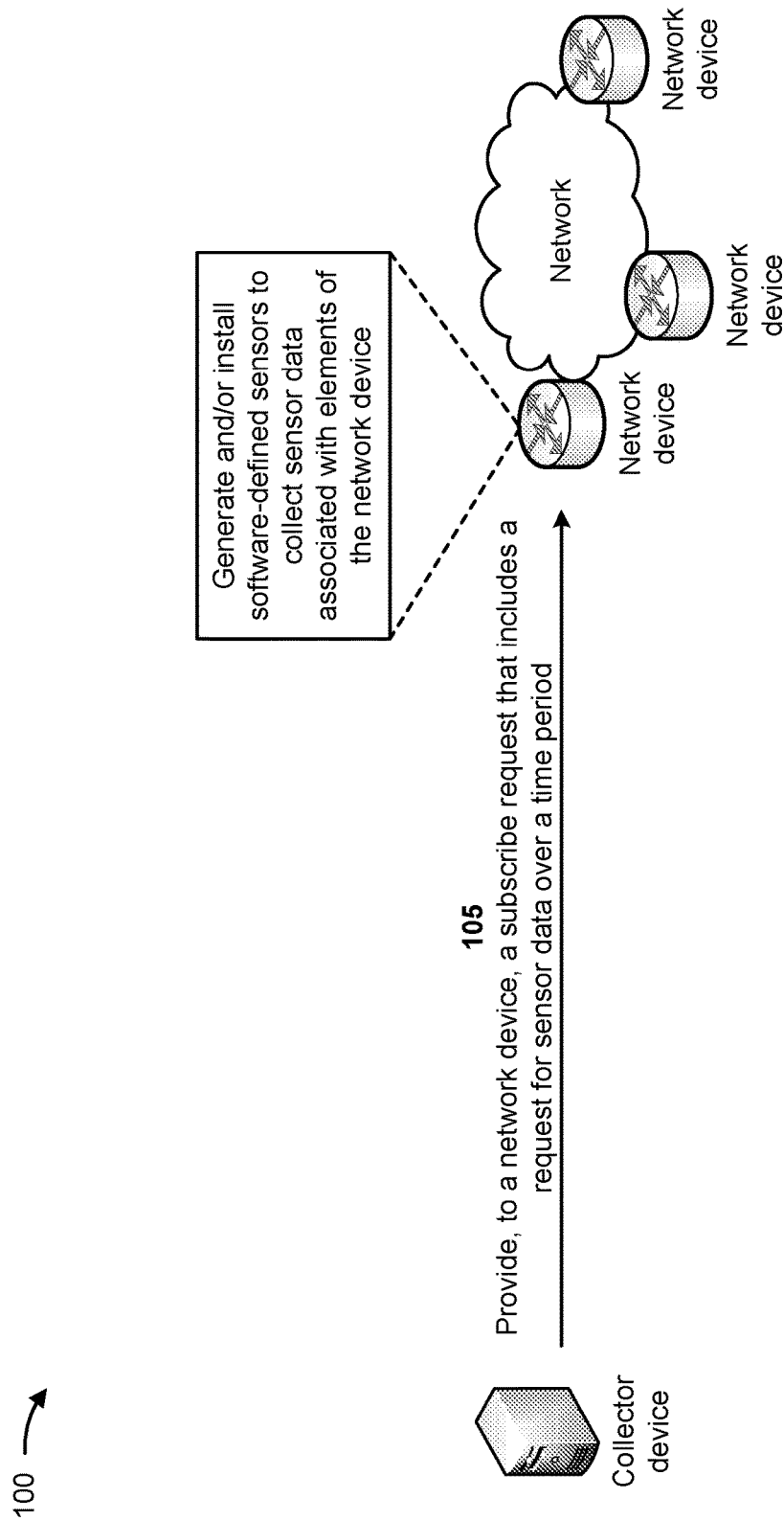

The following detailed description of example implementations refers to the accompanying drawings. The same reference numbers in different drawings may identify the same or similar elements.

A telemetry collector device may utilize a subscribe request (e.g., a remote procedure call (RPC) request) to cause a target device (e.g., a network device) to install software-defined sensors that collect sensor data (e.g., data associated with operation of the network device) with a particular frequency (e.g., periodically, when a change occurs, based on a threshold, and/or the like). For example, the software-defined sensors may collect sensor data identifying routes associated with the network device, a temperature of the network device, throughput of ports of the network device, input bytes of the network device, output bytes of the network device, neighbor routes associated with the network device, processor utilization by the network device, and/or the like. The network device may provide the sensor data to the collector device at a configured reporting interval that is based on the particular frequency. The network device may include thousands, tens of thousands, and/or the like interfaces, and a wrap may occur when the sensor data is received from all of the elements of the network device.

However, for software-defined sensors that are configured for periodic sampling or for software-defined sensors that inherently support only periodic sampling, there is no defined method for the collector device to identify, during real-time, whether the network device has reported all of the sensor data for a wrap. Identifying the wrap as early as possible may enable the collector device to take an appropriate action for the network device. Current techniques for determining that the network device has reported all of the sensor data for a wrap require the collector device to cache sensor data from a previous wrap until a next wrap is completed. Such techniques cause the collector device to expend significant memory resources (e.g., for storing the sensor data) and processing resources (e.g., for comparing the sensor data to determine completion of a wrap). Thus, current techniques for collecting sensor data and/or for determining that the network device has reported all of the sensor data for a wrap waste computing resources (e.g., processing resources, memory resources, communication resources, and/or the like), network resources, and/or the like associated with storing sensor data, comparing the sensor data to determine completion of a wrap, delayed detection of completion of a wrap, delayed performance of actions in response to analysis of a wrap, and/or the like.

Some implementations described herein relate to a collector device that provides real-time detection of completion of collected sensor data of a network device (e.g., sensor data for a wrap). For example, the collector device may provide, to a network device, a subscribe request that includes a request for sensor data based on an event. The collector device may receive, based on the subscribe request, sensor data packets from the network device. Each of the sensor data packets may include the sensor data for one of a plurality of elements of the network device and a header extension identifying a respective group identifier for a respective group of sensor data and final packet information indicating whether the sensor data packet is a final one for the respective group. The collector device may store the sensor data packets until the final packet information of one of the sensor data packets indicates that the one of the sensor data packets is a final sensor data packet for the respective group of sensor data. The collector device may identify a complete set of the sensor data packets when the final packet information of the one of the sensor data packets indicates that the one of the sensor data packets is the final sensor data packet for the respective group of sensor data. The collector device may perform one or more actions based on the complete set of the sensor data packets.

In this way, the collector device provides real-time detection of completion of collected sensor data of a network device. The collector device may provide, in headers of sensor data packets, an end of wrap identifier (e.g., final packet information) that identifies completion of a wrap. The collector device may store the sensor data and may determine that the sensor data is complete when the end of wrap identifier is received in one of the sensor data packets. Once the sensor data is determined to be complete, the collector device may perform actions based on the complete sensor data, such as addressing errors, generating alarms, performing traffic engineering, performing load balancing, and/or the like. This, in turn, conserves computing resources, networking resources, and/or the like that would otherwise have been wasted in storing sensor data, comparing the sensor data to determine completion of a wrap, delayed detection of completion of a wrap, delayed performance of actions in response to analysis of a wrap, and/or the like.

FIGS. 1A-1E are diagrams of an example 100 associated with providing real-time detection of completion of collected sensor data of a network device. As shown in FIGS. 1A-1E, example 100 includes a collector device associated with a network that includes multiple network devices. The collector device may include a server device, a cloud-based device, and/or the like that receives information from the network devices, as described herein. Each of the network devices may include a router, a gateway, a switch, a firewall, a hub, a bridge, a reverse proxy, and/or the like. Although FIGS. 1A-1E describe the collector device interacting with a single network device, in some implementations, the collector device may interact with the other network devices in a similar manner.

As shown in FIG. 1A, and by reference number 105, the collector device provides, to a network device, a subscribe request that includes a request for sensor data over a time period. In some implementations, the collector device provides the subscribe request to the network device via an RPC network management interface protocol. The collector device may provide the subscribe request to the network device to cause the network device to generate and/or install software-defined sensors that collect sensor data associated with one or more of a plurality of elements (e.g., one or more interfaces, one or more resources, one or more hardware components, and/or the like) of the network device.

In some implementations, the subscribe request may include information identifying a mode associated with the software-defined sensors. The mode may indicate an interval at which the software-defined sensors collect the sensor data. For example, the mode may be a periodic mode (e.g., the software-defined sensors collect the sensor data periodically), an on-change mode (e.g., the software-defined sensors collect the sensor data based on a change in the sensor data), a target-defined mode (e.g., the network device determines a frequency at which the software-defined sensors collect the sensor data), and/or the like.

As shown in FIG. 1A, the collector device receives the subscribe request and generates and/or installs the software-defined sensors to collect the sensor data based on receiving the subscribe request. In some implementations, the software-defined sensors may be configured to collect the sensor data based on the mode indicated in the subscribe request. For example, the software-defined sensors may be configured to collect the sensor data periodically (e.g., based on an expiration of a time period), based on a satisfaction of a threshold by the sensor data, based on an occurrence of a change in the sensor data, based on a frequency determined by the network device, and/or the like.

For each wrap, the network device may generate a plurality of sensor data packets. A sensor data packet, of the plurality of sensor data packets, may include sensor data and a header extension. The sensor data may include data associated with an element of the network device, data obtained by a software-defined sensor, and/or the like. For example, the sensor data may include data identifying a route associated with the network device, a temperature of the network device, a throughput of a port of the network device, an input byte of the network device, an output byte of the network device, a neighbor route associated with the network device, a processor utilization by the network device, data associated with unicast packets generated by the network device, and/or the like.

The header extension may include information identifying a group identifier identifying a wrap associated with the sensor data and final packet information associated with the sensor packet. In some implementations, the header extension is included in a GNMI extension and/or the group identifier includes a wrap number. For example, as shown in FIG. 1B, the header extension includes information indicating that the group identifier for sensor data 1 is 0 (e.g., groupID=0, as shown in FIG. 1B).

The final packet information may include information indicating whether a sensor data packet is a final (e.g., last) sensor data packet for the wrap identified by the group identifier. For example, the final packet information may include a variable that is set to a first value (e.g., 1, true, and/or the like) when the sensor data packet is the final sensor data packet for the wrap identified by the group identifier. The variable may be set to a second value (e.g., 0, false, and/or the like) when the sensor data packet is not the final sensor data packet for the wrap identified by the group identifier.

Figure 1B:
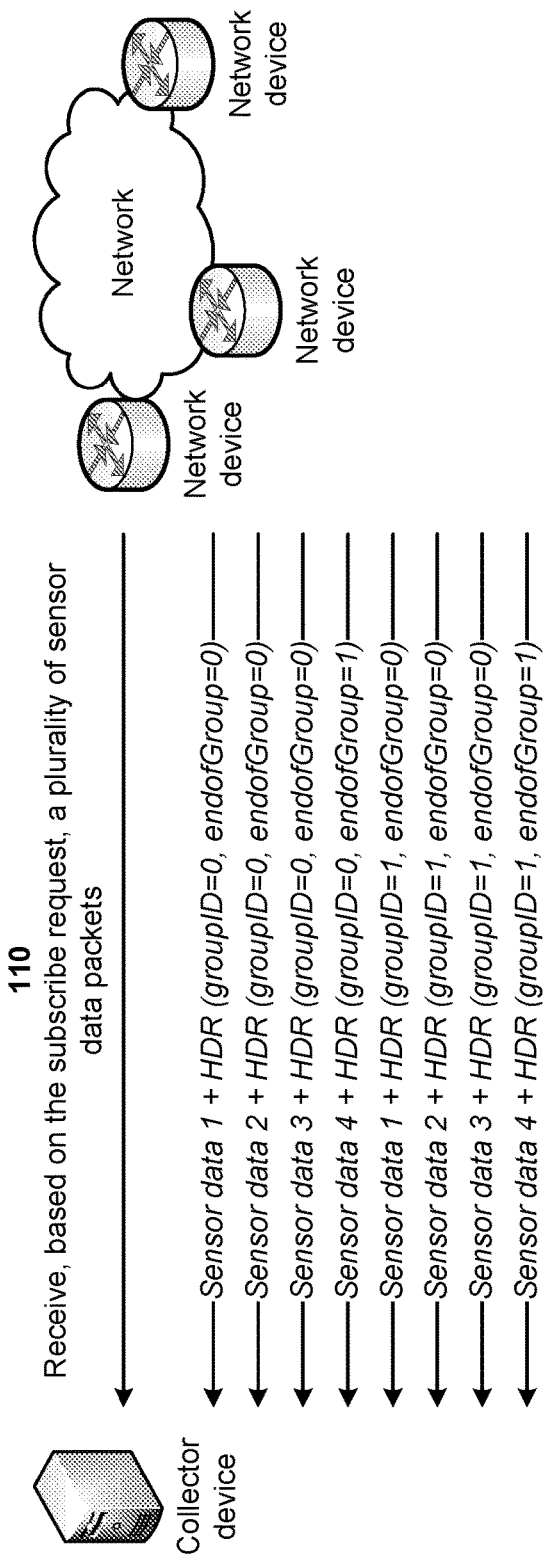

As shown in FIG. 1B, the network device provides the plurality of sensor data packets to the collector device. The network device may provide the plurality of sensor data packets to the collector device based on a reporting frequency determined based on the mode associated with the software-defined sensors. For example, the collector device may periodically provide the plurality of sensor data packets to the collector device based on the software-defined sensors being configured to periodically collect the sensor data.

As shown by reference number 110, the collector device receives, based on the subscribe request, the plurality of sensor data packets from the network device. In some implementations, the collector device receives the plurality of sensor data packets via a RPC network management interface protocol.

Figure 1C:
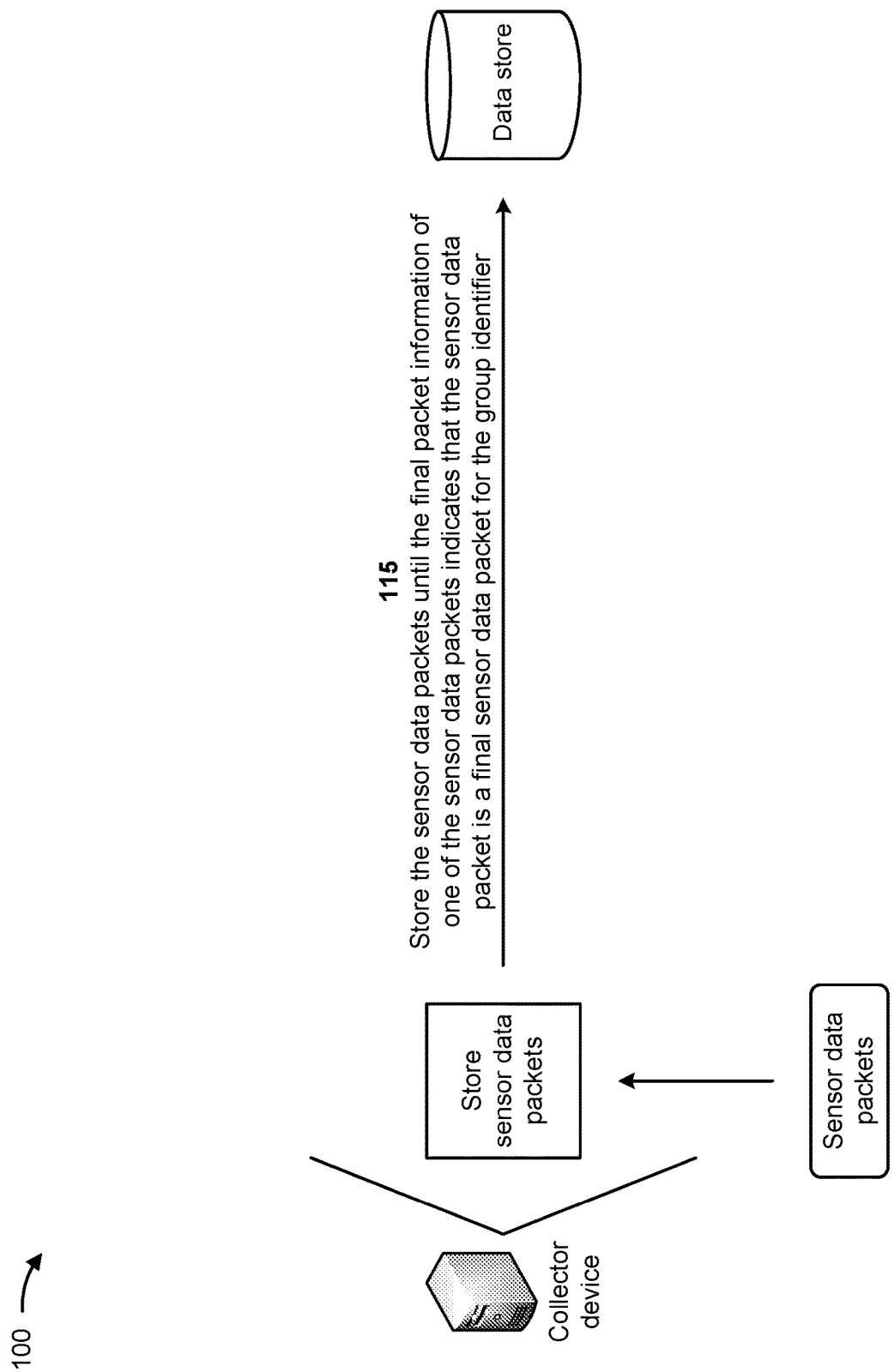

As shown in FIG. 1C, and by reference number 115, the collector device stores the sensor data packets until the final packet information of one of the sensor data packets indicates that the sensor data packet is a final sensor data packet for the group identifier. For example, the collector device may analyze the final packet information of a sensor data packet and may determine whether the variable included in the final packet information is set to the first value or the second value. The collector device may store the sensor data packet in a memory (e.g., a cache) associated with the collector device. The collector device may determine that the sensor data packet is a final sensor data packet for the group identified by the group identifier when the variable is set to the second value.

As shown in FIG. 1D, and by reference number 120, the collector device identifies a complete set of the sensor data packets when the final packet information of one of the sensor data packets indicates that the sensor data packet is a final sensor data packet for the group identifier. The collector device may analyze the stored sensor data associated with the wrap identified by the group identifier based on determining that the final packet information indicates that the sensor data packet is the final sensor data packet for the group. The collector device may determine one or more actions to be performed by the collector device and/or another device (e.g., the network device) based on analyzing the stored sensor data.

Figure 1E:
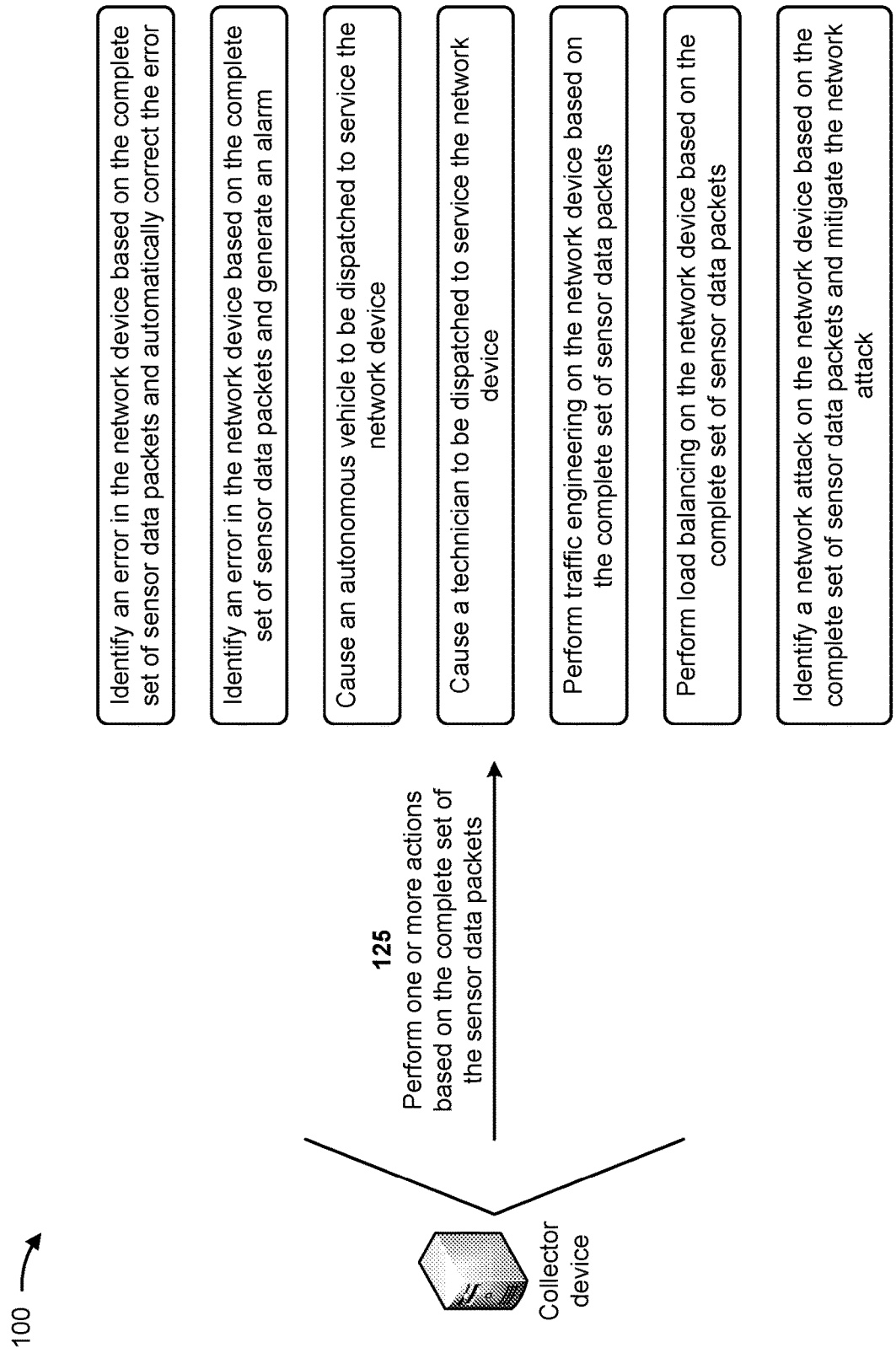

As shown in FIG. 1E, and by reference number 125, the collector device performs the one or more actions based on the complete set of sensor data packets. In some implementations, the one or more actions include the collector device identifying an error in the network device based on the complete set of sensor data packets and automatically correcting the error and/or generating an alarm. For example, the collector device may identify a software issue and/or a hardware issue associated with the network device based on analyzing the stored sensor data. The collector device may automatically perform one or more actions to correct the software issue and/or the hardware issue and/or may generate an alarm to notify a user (e.g., a technician) of the software issue and/or the hardware issue. Alternatively, and/or additionally, the one or more actions include the collector device causing an autonomous vehicle and/or a technician to be dispatched to service the network device. For example, the collector device may generate the alarm and/or provide a notification to an autonomous vehicle and/or a user device associated with a technician to cause the autonomous vehicle and/or the technician to be dispatched to a location of the network device to address the software issue and/or the hardware issue.

In some implementations, the one or more actions include the collector device performing traffic engineering on the network device based on the complete set of sensor data packets. For example, the collector device may determine one or more performance characteristics associated with a network path based on analyzing the stored sensor data. The collector device may determine a link weight associated with the network path based on the one or more performance characteristics. The collector device may provide information identifying the link weight to the network device. The network device may utilize the link weight for determining routing information for routing data packets through a network. In this way, the collector device may automatically determine optimized link weights for the network device.

In some implementations, the one or more actions include the collector device performing load balancing on the network device based on the complete set of sensor data packets. The collector device may determine respective loads associated with one or more ports, one or more interfaces, and/or the like of the network device based on analyzing the stored sensor data. The collector device may perform load balancing on the network device based on the respective loads.

In some implementations, the one or more actions include the collector device identifying a network attack on the network device based on the complete set of sensor data packets and mitigating the network attack. The collector device may determine an occurrence of a particular type of network attack (e.g., a denial of service attack) on the network device based on analyzing the stored sensor data. The collector device may provide information associated with the particular type of network attack to the network device and/or to a security device (e.g., a firewall) associated with the network device and/or cause the network device and/or the security device to perform one or more security actions to mitigate the particular type of network attack.

In this way, the collector device provides real-time detection of completion of collected sensor data of a network device. The collector device may provide, in headers of sensor data packets, an end of wrap identifier that identifies completion of a wrap. The collector device may store the sensor data and may determine that the sensor data is complete when the end of wrap identifier is received in one of the sensor data packets. Once the sensor data is determined to be complete, the collector device may perform actions based on the complete sensor data, such as addressing errors, generating alarms, performing traffic engineering, performing load balancing, and/or the like. This, in turn, conserves computing resources, networking resources, and/or the like that would otherwise have been wasted in storing sensor data, comparing the sensor data to determine completion of a wrap, delayed detection of completion of a wrap, delayed performance of actions in response to analysis of a wrap, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
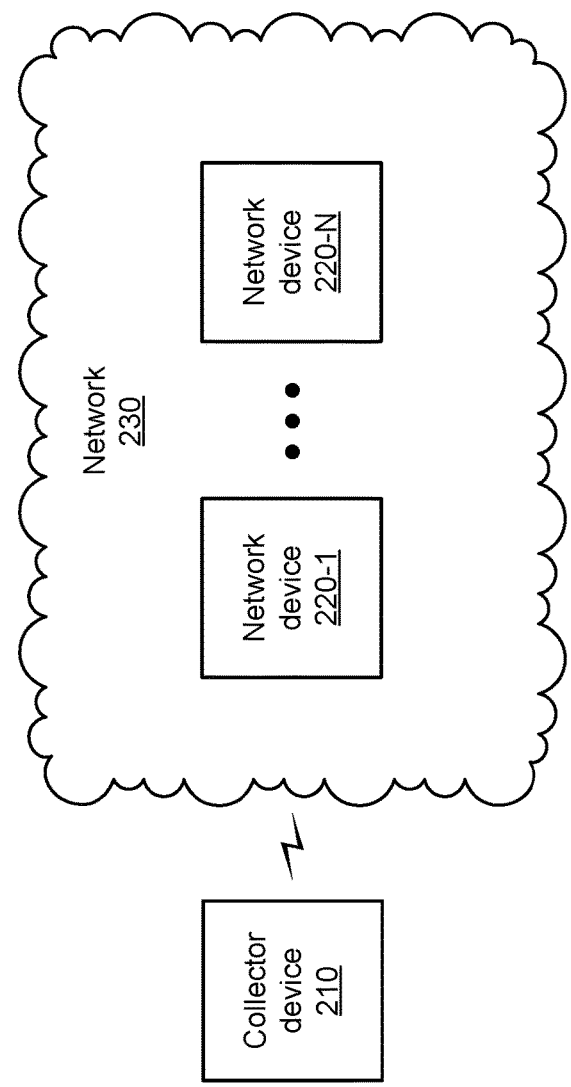
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a collector device 210, a group of network devices 220 (shown as network device 220-1 through network device 220-N), and a network 230. Devices of environment 200 may interconnect via wired connections, wireless connections, or a combination of wired and wireless connections.

Collector device 210 includes one or more devices capable of receiving, generating, storing, processing, providing, and/or routing information, as described elsewhere herein. Collector device 210 may include a communication device and/or a computing device. For example, collector device 210 may include a server, such as an application server, a client server, a web server, a database server, a host server, a proxy server, a virtual server (e.g., executing on computing hardware), a data center server, or a server in a cloud computing system. In some implementations, collector device 210 includes computing hardware used in a cloud computing environment.

Network device 220 includes one or more devices capable of receiving, processing, storing, routing, and/or providing traffic (e.g., a payload packet, an application, etc.) in a manner described herein. For example, network device 220 may include a router, such as a label switching router (LSR), a label edge router (LER), an ingress router, an egress router, a provider router (e.g., a provider edge router, a provider core router, etc., a virtual router, and/or the like). Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device.

In some implementations, network device 220 may be a physical device implemented within a housing, such as a chassis. In some implementations, network device 220 may be a virtual device implemented by one or more computer devices of a cloud computing environment or a data center. In some implementations, network device 220 may be an edge network device in network 230. In some implementations, network device 220 may be an intermediary network device in network 230 (i.e., a network device between two or more edge network devices).

Network 230 includes one or more wired and/or wireless networks. For example, network 230 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
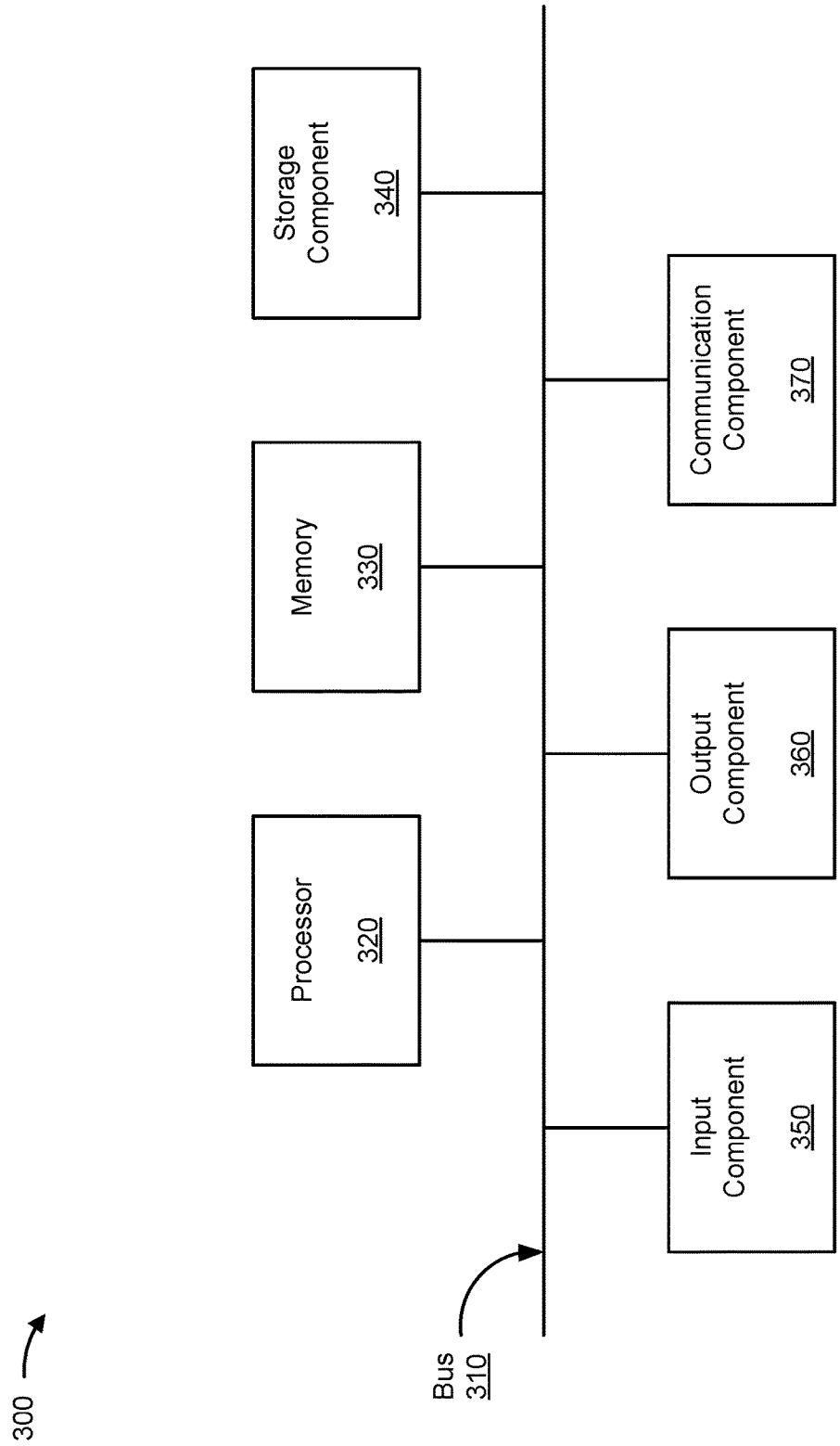
FIGS. 3 and 4 are diagrams of example components of one or more devices of FIG. 2.

FIG. 3 is a diagram of example components of a device 300, which may correspond to collector device 210 and/or network device 220. In some implementations, collector device 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
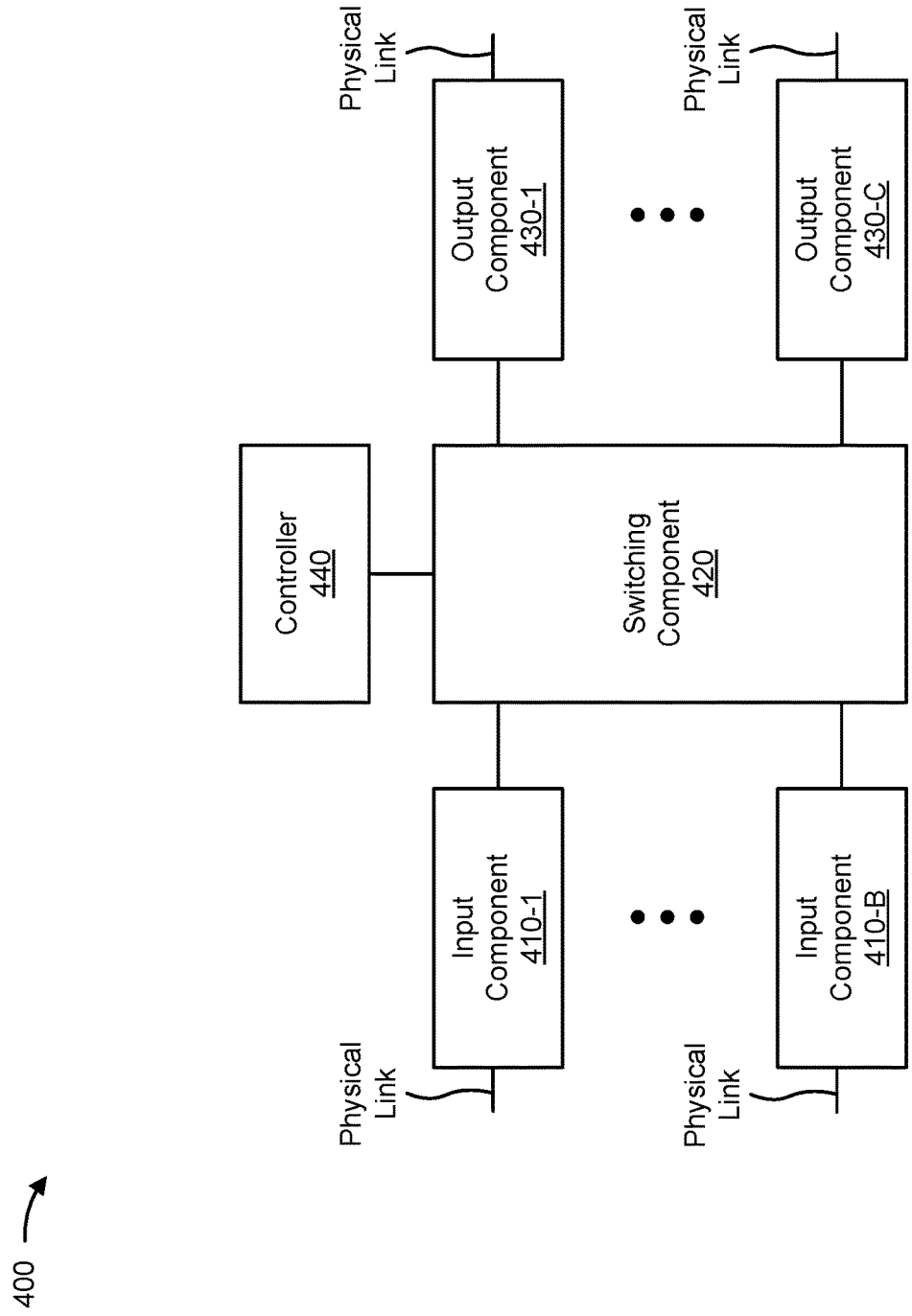

FIG. 4 is a diagram of example components of a device 400. Device 400 may correspond to network device 220. In some implementations, network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for providing real-time detection of completion of collected sensor data of a network device. In some implementations, one or more process blocks of FIG. 5 may be performed by a device (e.g., collector device 210). In some implementations, one or more process blocks of FIG. 5 may be performed by another device or a group of devices separate from or including the device, such as a network device (e.g., network device 220). Additionally, or alternatively, one or more process blocks of FIG. 5 may be performed by one or more components of device 300, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include providing, to a network device, a subscribe request that includes a request for sensor data based on an event (block 510). For example, the device may provide, to a network device, a subscribe request that includes a request for sensor data based on an event, as described above. In some implementations, the device may provide the subscribe request to the network device via a remote procedure call network management interface protocol.

The subscribe request may cause the network device to install software-defined sensors that collect sensor data associated with one or more of the plurality of interfaces of the network device. The event may include an expiration of a time period (e.g., periodically), a satisfaction of a threshold by the sensor data, and/or an occurrence of a change in the sensor data.

As further shown in FIG. 5, process 500 may include receiving, based on the subscribe request, sensor data packets, wherein each of the sensor data packets includes the sensor data for one of a plurality of interfaces of the network device and a header extension identifying a respective group identifier for a respective group of sensor data and a final packet information indicating whether the sensor data packet is a final one for the respective group (block 520). For example, the device may receive, based on the subscribe request, sensor data packets, as described above. In some implementations, each of the sensor data packets includes the sensor data for one of a plurality of interfaces of the network device and a header extension identifying a respective group identifier for a respective group of sensor data and final packet information indicating whether the sensor data packet is a final one for the respective group.

In some implementations, the device receives the sensor data packets via a remote procedure call network management interface protocol. In some implementations, a respective group of sensor data is received from all of a plurality of interfaces of the network device. The sensor data may include data identifying a route associated with the network device, a temperature of the network device, a throughput of a port of the network device, an input byte of the network device, an output byte of the network device, a neighbor route associated with the network device, a processor utilization by the network device, and/or a unicast packet generated by the network device.

As further shown in FIG. 5, process 500 may include storing the sensor data packets until the final packet information of one of the sensor data packets indicates that the one of the sensor data packets is a final sensor data packet for the respective group of sensor data (block 530). For example, the device may store the sensor data packets until the final packet information of one of the sensor data packets indicates that the one of the sensor data packets is a final sensor data packet for the respective group of sensor data, as described above.

As further shown in FIG. 5, process 500 may include identifying a complete set of the sensor data packets when the final packet information of the one of the sensor data packets indicates that the one of the sensor data packets is the final sensor data packet for the respective group of sensor data (block 540). For example, the device may identify a complete set of the sensor data packets when the final packet information of the one of the sensor data packets indicates that the one of the sensor data packets is the final sensor data packet for the respective group of sensor data, as described above.

As further shown in FIG. 5, process 500 may include performing one or more actions based on the complete set of the sensor data packets (block 550). For example, the device may perform one or more actions based on the complete set of the sensor data packets, as described above. In some implementations, the device may perform the one or more actions in near real-time relative to identifying the complete set of the sensor data packets. In some implementations, the one or more actions include analyzing the complete set of the sensor data packets to generate at least one result and performing the one or more actions based on the at least one result.

In some implementations, the one or more actions include causing an autonomous vehicle to be dispatched to service the network device, causing a technician to be dispatched to service the network device, performing traffic engineering on the network device based on the at least one result, and/or performing load balancing on the network device based on the at least one result. In some implementations, the one or more actions include identifying an error associated with the network device based on the at least one result and automatically causing the error to be corrected and/or generating an alarm based on the error. Alternatively, and/or additionally, the one or more actions may include identifying a network attach on the network device based on the at least one result and performing an action to mitigate the network attack.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   sending, by a device, a request to subscribe to receive one or more packets associated with one or more sensors;
   receiving, by the device and based on sending the request, the one or more packets associated with the one or more sensors,
      wherein a packet of the one or more packets includes an extension, associated with the packet, comprising a group identifier associated with a sensor, of the one or more sensors, and information indicating whether the packet is a final packet related to a group identified by the group identifier;
   identifying, by the device, a set of the one or more packets when a particular extension of a particular packet of the one or more packets indicates that the particular packet is a final packet related to a particular group associated with the one or more sensors; and
   performing, by the device and based on the set of the one or more packets, one or more actions.

2. The method of claim 1, wherein the request to subscribe causes generation of software-defined sensors that collect the one or more packets associated with the one or more sensors.

3. The method of claim 1, wherein the request to subscribe is provided via a remote network protocol.

4. The method of claim 1, wherein the one or more packets associated with the one or more sensors are received via a remote network protocol.

5. The method of claim 1, wherein the one or more actions include:
   identifying an error associated with the device; and
   generating an alarm based on the error.

6. The method of claim 1, further comprising:
   analyzing the set of the one or more packets to generate at least one result; and
   performing the one or more actions based on the at least one result.

7. The method of claim 1, wherein the one or more actions include:
   identifying a network attack on the device based on the set of one or more packets; and
   mitigating the network attack.

8. A device, comprising:
   one or more memories; and
   one or more processors, coupled to the one or more memories, configured to:
      send a request to subscribe to receive one or more packets associated with one or more sensors;
      receive, based on sending the request, the one or more packets associated with the one or more sensors,
         wherein a packet of the one or more packets includes an extension, associated with the packet, comprising a group identifier associated with a sensor, of the one or more sensors, and information indicating whether the packet is a final packet related to a group identified by the group identifier;
      identify a set of the one or more packets when a particular extension of a particular packet of the one or more packets indicates that the particular packet is a final packet related to a particular group associated with the one or more sensors; and
      perform, based on the set of the one or more packets, one or more actions.

9. The device of claim 8, wherein the request to subscribe causes generation of software-defined sensors that collect the one or more packets associated with the one or more sensors.

10. The device of claim 8, wherein the request to subscribe is provided via a remote network protocol.

11. The device of claim 8, wherein the one or more packets associated with the one or more sensors are received via a remote network protocol.

12. The device of claim 8, wherein the one or more actions include:
    identifying an error associated with the device; and
    generating an alarm based on the error.

13. The device of claim 8, wherein the one or more processors are further configured to:
    analyze the set of the one or more packets to generate at least one result; and
    perform the one or more actions based on the at least one result.

14. The device of claim 8, wherein the one or more actions include:
    identifying a network attack on the device based on the set of one or more packets; and
    mitigating the network attack.

15. A non-transitory computer-readable medium storing a set of instructions, the set of instructions comprising:
    one or more instructions that, when executed by one or more processors of a device, cause the device to:
       send a request to subscribe to receive one or more packets associated with one or more sensors;
       receive, based on sending the request, the one or more packets associated with the one or more sensors,
          wherein a packet of the one or more packets includes an extension, associated with the packet, comprising a group identifier associated with a sensor, of the one or more sensors, and information indicating whether the packet is a final packet related to a group identified by the group identifier;
       identify a set of the one or more packets when a particular extension of a particular packet of the one or more packets indicates that the particular packet is a final packet related to a particular group associated with the one or more sensors; and
       perform, based on the set of the one or more packets, one or more actions.

16. The non-transitory computer-readable medium of claim 15, wherein the request to subscribe causes generation of software-defined sensors that collect the one or more packets associated with the one or more sensors.

17. The non-transitory computer-readable medium of claim 15, wherein the request to subscribe is provided via a remote network protocol.

18. The non-transitory computer-readable medium of claim 15, wherein the one or more packets associated with the one or more sensors are received via a remote network protocol.

19. The non-transitory computer-readable medium of claim 15, wherein the one or more actions include:
  identifying an error associated with the device; and
  generating an alarm based on the error.

20. The non-transitory computer-readable medium of claim 15, wherein the one or more instructions further cause the device to:
  analyze the set of the one or more packets to generate at least one result; and
  perform the one or more actions based on the at least one result.

* * * * *